Figure 1:
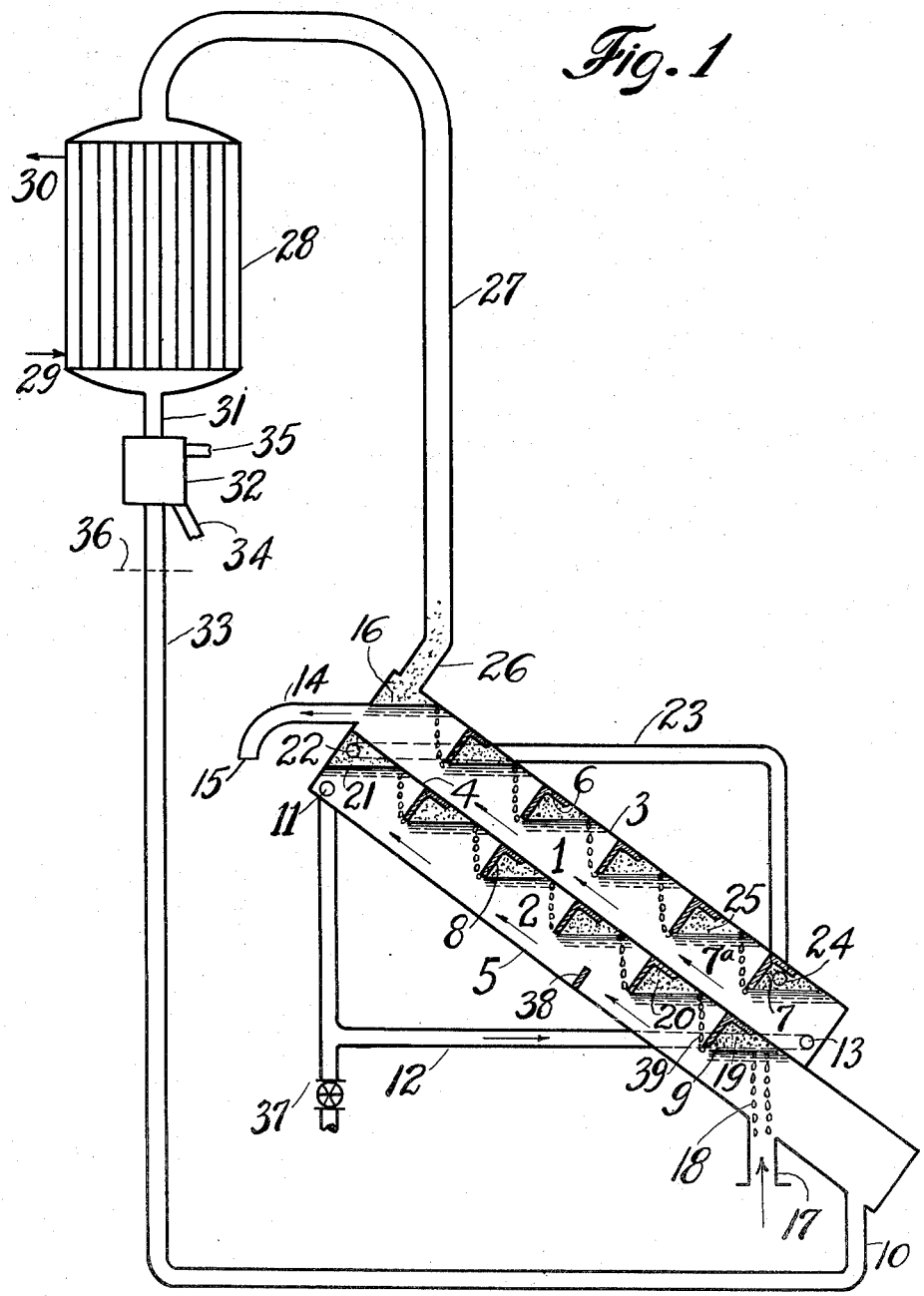

Dec. 4, 1934.   J. F. WAIT   1,983,058
PROCESS AND APPARATUS FOR FRACTIONATION
Filed June 18, 1930   3 Sheets-Sheet 1

INVENTOR

Dec. 4, 1934. J. F. WAIT 1,983,058
PROCESS AND APPARATUS FOR FRACTIONATION
Filed June 18, 1930 3 Sheets-Sheet 2

INVENTOR

Dec. 4, 1934.  J. F. WAIT  1,983,058

PROCESS AND APPARATUS FOR FRACTIONATION

Filed June 18, 1930  3 Sheets-Sheet 3

INVENTOR

Justin F. Wait

Patented Dec. 4, 1934

1,983,058

UNITED STATES PATENT OFFICE 1,983,058

PROCESS AND APPARATUS FOR FRACTIONATION

Justin F. Wait, New York, N. Y.

Application June 18, 1930, Serial No. 461,941

12 Claims. (Cl. 261—123)

This invention relates to improvements in the art of distillation and the apparatus used therefor. It pertains particularly to methods of fractionating or separating distillates and may involve the use of compact apparatus so arranged as to give a high capacity per unit of volume. It further pertains to methods of controlling factors which determine the efficiency of fractionation.

The ordinary method of fractionation involves a column or tower which may be fitted with ordinary tower fillers or equivalents of special design; or the tower may be designed of "bubbler" elements which cause the vapors to pass in a counter current direction to the liquid and in a manner whereby they scrub the liquid. Another method of fractionation involves the use of condensers through which the vapors pass and which are so constructed and so controlled as to give condensate of different condensing and hence boiling points.

I have found it desirable to cause vapors to pass in close contact with a liquid, such as reflux, or liquid to be treated and in a manner whereby the flow of liquid is continuous through the system, the vapors at the same time, scrubbing successive portions of the liquid and in a manner whereby close contact of said liquid and said vapors cause equilibrium to be approached in a manner conducive to efficient separation. I have found this may be accomplished by flowing the reflux or other liquid beneath a series of open bottomed pockets arranged at different elevations and each adapted to be sealed at its bottom by the liquid and at the same time passing a gaseous body through the liquid in suchwise that it accumulates in each of the pockets in succession and then escapes through the liquid sealing the bottom of the pocket and disperses through the liquid bubbling up into the pocket next above. In effect this phase of the action is somewhat similar to that of the "bubbler" column. This system may be used for fractionation of distilled liquids or for treating liquids with a gaseous product and also for the separation of gaseous products from liquids and for other similar processes.

One embodiment of apparatus for carrying out the above step comprises an inclined liquid conduit, the upper longitudinal portion or roof of which is provided with a plurality of depending baffles which form with the roof pockets as aforesaid. If such apparatus is made of sheet metal and standard structural forms, the cost is relatively low. Flat structures are not well suited for other than near atmospheric pressure wherefore a preferred method involves structural features which permit of balancing or decreasing the effective pressure tending to deform the apparatus and promote leakage. This may be accomplished by encasing the primary structure in a secondary structure better adapted to withstanding pressure.

Figure 2:
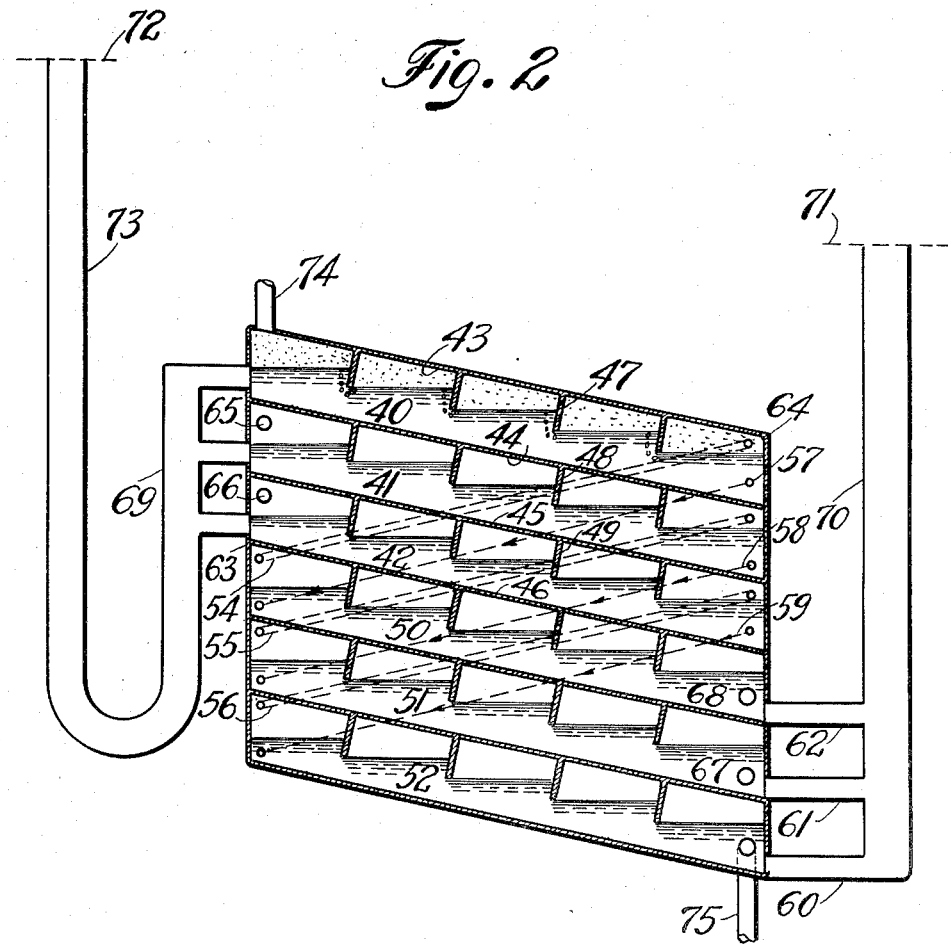
Figure 3:
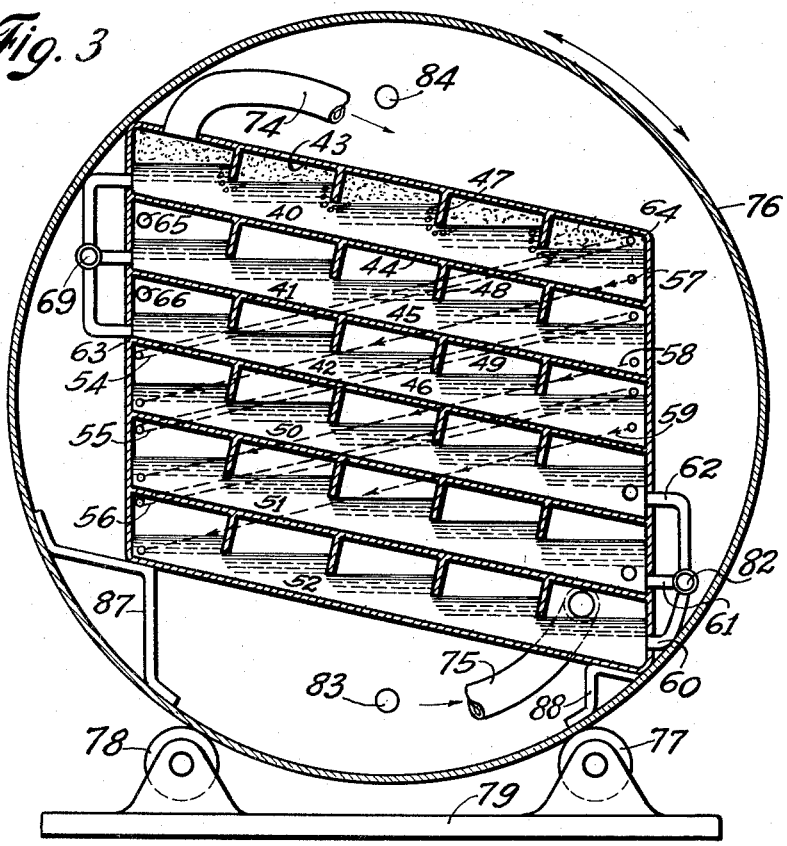
Figure 4:
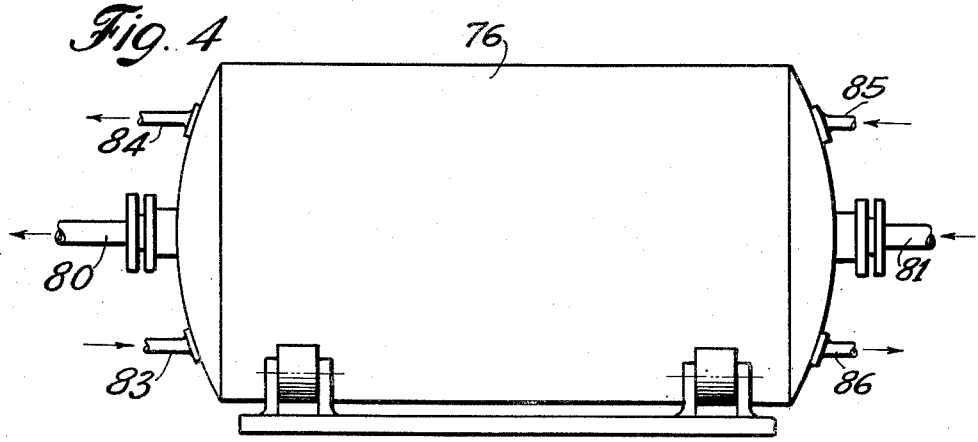

Figures 1 and 2 are diagrammatic representations of two forms of apparatus in sectional elevation, Fig. 3 is a cross section and Fig. 4 is an elevation of the contact apparatus of Fig. 3 enclosed in a drum for the purpose of varying the slope of the baffles and applying vacuum or superatmospheric pressure.

Referring to Fig. 1 channels 1 and 2 are contained within the surfaces of plates 3, 4 and 5. The upper plates of each channel contain the baffle such as 6, 7, 8 and 9. An inlet 10 discharges liquid into the lower channel 2, said liquid flowing in the direction indicated by arrows and finally reaching the outlet 11 which connects by means of passage 12 to inlet 13 of channel 1, the arrangement being such that the liquid will discharge through outlet 14 and overflow or be otherwise discharged through the level controlling member 15, the liquid rising to the elevation of 16.

The vapors would enter the apparatus through an inlet 17 rising in bubbles indicated by 18 into the pocket 19, from which the vapors will escape under baffle 9 as indicated by bubbles 39 which would again rise and accumulate in pocket 20 next above and escape under subsequent baffles. In escaping under baffle 9, the vapors or other gaseous substances thoroughly scrub the liquid in the channel or passage 2 as they pass downwardly through the opening between the lower edge of baffle 9 and the plate 5. This escape and bubbling action will continue until the vapors reach the zone 21 with a vapor outlet 22 connecting through passage 23 to inlet 24 of channel 1, wherein the vapors escape under baffle 7, bubbling as indicated to pocket 25 and thence through subsequent pockets to the outlet 26 connected by a pipe 27 to the condenser 28 provided with cooling water inlet 29 and outlet 30. This condenser may be of tubular or other type and is provided with outlet 31 and condensate receiver and separator 32 in which a dividing mechanism may be provided so as to control the amounts of condensate returned through pipeline 33 and discharged from the system through the outlet 34. Non-condensible gaseous fluids may be discharged as by means of outlet 35 for subsequent recovery or other purposes.

The gaseous fluid contained in zone 20 is shown as being in thermal contact with liquid contained in liquid zone 7a beneath gaseous fluid zone 25 which two zones are located remote from zone 20 as regards progress of the fluids through the system.

The liquid contained within 33 will normally be at some elevation such as is indicated by 36. The difference in elevation between 36 and 16 is the equivalent static head which causes flow of the liquid through the fractionating zone. The elevation of 16 may be varied, as by raising or lowering the conduits 1 and 2 relatively to other parts of the apparatus, so as to change the pressure under which the fractionating zone will operate, thus making it possible to control this factor of fractionation. The apparatus may be provided with other adjustable means, not illustrated, for producing the same result.

One feature of the invention involves the thermal contact of the vapors of one zone, for example 20, with the liquid at a remote zone such as 7a, which is seventh removed therefrom along the liquid and vapor paths. The liquid passing through channel 1 at the zone 7a is thus heated by reason of the hotter vapors contained in the zone 20 and in turn the vapors in 20 are partially condensed by the relatively cool liquid flowing at 7a. My invention thus makes it possible to get appreciable heat transfer by indirect means as compared with the usual system in which the vapors of one zone can contact only with the liquid of the next succeeding zone. Another point of distinction is that the bodily flow of liquid is continuous throughout the system, or substantially so. The path of escape of the vapors from each pocket is coincident with the path of liquid flow from beneath each pocket, whereas in the ordinary "bubbler" column, the liquid escaping from zone to zone is separate and distinct from the vapor passage.

The process is so devised that all portions of the liquid are treated substantially alike. They pass through a succession of combined zones and are subjected therein to the scrubbing action of the vapors or gases escaping under the edges of the baffles. The ordinary "bubbler" cap passes vapors in contact with liquid which surges in and out as regards the escape edge. In my invention there is a positive flow across the escape edges thus insuring a continuous supply of liquid to be scrubbed.

The liquid and the vapors both flow through channels of varying cross sections and hence assume varying velocities. This feature assures thorough mixing as compared with the ordinary bubbling column wherein a vapor passage between the decks is substantially uniform as is also the depth or thickness of the liquid, the liquid at the same time flowing with little or no control so that the successive portions are not treated alike. In a similar manner the vapors escaping from the edge of one "bubbler cap" to that of the "bubbler cap" contained in the section immediately overhead is more or less of a direct transfer, whereas in the apparatus described herein the vapors contained in the bubbles move horizontally with varying velocity, as in chamber 20 and from chamber 20 to the chamber at 22.

The product to be treated or condensate may be introduced at an intermediate point such as 37. In like manner portions of liquid and/or gaseous fluid may be withdrawn from one or more intermediate points in an installation involving a large number of baffles. Baffle 38, in multiplicity as desired and similarly arranged, may be used to break up or divert the flow from that of a straight line thus yielding greater efficiency and making possible a degree of separation not otherwise obtainable.

Another feature of this invention allows the actual flow of liquid from one zone to a higher level, as for example from 10 to 11 and similarly the downward flow of the vapors from 22 to 24, which features are to be contrasted with those of the ordinary system in which the flow of both liquid and vapors are in effect unidirectional.

The slope which influences factors such as kind and distribution of bubbles and depth of submergence may also determine the size and shape of the gaseous baffled zone such as that at 20 and 25. By the expression "baffled zones" is meant zones which are restricted as to size by means of baffles or their equivalent and in a manner approximately as indicated.

It is apparent from the illustration that if the angle of slope is changed the direction of flow of the liquid is changed. Such change of direction causes a change in the distance that the dispersed fluid, in bubble or film or ribbon form, travels from the zone of dispersion to the zone of agglomeration. For this and other accompanying reasons the degree of contact between said fluid and said liquid is controlled and/or affected by control of the direction of flow of the liquid.

The apparatus illustrated on Figure 1 may be operated with only one channel, in which case either unidirectional or counter-current flow may be used.

The Figure 2 shows a construction designed primarily for operation with countercurrent flow and wherein three channels are operated parallel with respect to one another.

The inlet 69 supplies liquid to channels 40, 41 and 42 which are formed between plates 43, 44, 45 and 46. Baffles 47, 48 and 49 etc. are used to promote dispersion and agglomeration of the gaseous fluid as previously described.

These channels (40, 41 and 42) connect with channels 50, 51 and 52 by means of gaseous fluid connections 54, 55 and 56 and liquid connections 57, 58 and 59. The discharge from channels 50, 51 and 52 may be as through individual lines 62, 61 and 60 respectively connecting with a line 70 with liquid level maintained at 71 which is preferably below liquid level 72 of the liquid contained in the feed line 73.

This arrangement insures positive flow and discharge of the liquid from one channel to the next succeeding channel as is caused by the placement of the corner 63 of channel 50 below the corner 64 of channel 40, whereas at the same time all of the space between channels 40 and 50 is occupied by other channels, which fact gives a very high capacity per unit of volume of the equipment. The cross sectional shape of the channels may be that of a rectangle instead of a parallelogram as indicated and the desired slope or direction of flow obtained by tipping or tilting the rectangular structure. The tipping of the structure, above referred to, may then be brought about as by rotating the cylinder-like encasing shell. The elevations of the baffles with respect to one another may thus be changed. The obvious limit is that of an approximately horizontal position whereat the back pressure differential as between successive zones approaches and may become zero or substantially so as it is then limited to the head required to flow the fluid. In such extreme case it is apparent that the bubbled dispersion of the fluid yields to a relatively thin film or series of "ribbons" at the escapement edge and that reassembly or agglomeration of the "ribbons" occurs as before between the thinning out or dispersion. Where there is objection to appreciable head as in vacuum distillation it is preferable that the equipment be set up or rotated so as to yield minimum back pressure. In such case, the indicated mixing of the fluid with the liquid mixing such as may be obtained with vertical bottom-fastened baffles is adequate to promote the desired mutual escape between phases.

By mutual escape, is meant the escaping tendencies of the vapor phase and the liquid phase are such that materials flow from one to another. Thus the escaping tendency of components of the liquid phase promote passage of the more active into the vapor phase while the escaping tendency of components of the vapor phase causes transfer of appreciable amounts of a less volatile portion into the liquid thus yielding a mutual escape as between the phases. In the case of a soluble gas and a solute the escape is quite one-sided in that a greater amount of the gaseous phase escapes than does the liquid phase. When one gas is replacing a second gas in solution there is obviously an appreciable escape of the second gas from the liquid phase.

In other respects the apparatus illustrated in Fig. 2 will operate similarly to that illustrated in Fig. 1, and may be connected to condensers and/or other forms of auxiliary apparatus. This arrangement may be used to give parallel operation of any desired multiple of such channels and in a manner to increase the discharge surface or dimension of edge of escape of the gaseous fluid, which is frequently a factor sought.

The complete system or part thereof may be immersed within a liquid wherefore the entire apparatus below some such level as 16, Fig. 1 and its equivalent 71, Fig. 2 may be entirely surrounded by a liquid and/or a gaseous fluid which may have a component common with that of the gaseous and/or liquid fluid passed through the channel. The component or other portion may flow from the fractionating system to the immersing system.

The indicated construction may be made as by means of flat plates wherein the baffles would be of standard bar or angle iron construction. The angle iron or bars or their equivalent may be used to space plates and slots, holes, or other forms of openings cut or formed therein to cause the dispersion of the gaseous fluid. In other cases, bars or angles may be placed beneath such baffles and at right angles thereto to give the desired spacing between the edge of the baffle and the place beneath the same.

Vapors may be introduced at 75 which may be connected in parallel with 67 and 68. For fractionations at lower and/or scrubbing action with the descending liquid, the gaseous fluid may be discharged as from outlet 74 connected and parallel with 65 and 66 by lines not shown.

A manner in which the passageways may be submerged in fluid contained in a circumscribed drum is illustrated in Figs. 3 and 4. These illustrations further show how the form of dispersion may be varied. The parts of Fig. 2 are shown as being contained in a drum 76 adapted to rotate as on rollers 77 and 78 carried on base 79 and being fixed in controlled position by means of gears or other mechanism not shown. Fig. 4 shows an outside view of the drum to a reduced scale. Vapor outlet 74 may be curved to allow for expansion and so that it may axially discharge from drum 76 as indicated at 80 which line connects to a flexible joint, the vapors passing through stationary piping and downward to a condenser. Vapors may be admitted at 81 and flowed to line 75. Liquid line 82 is preferably curved for expansion and attached to line 83 while line 69 shown in Figs. 2 and 3 may connect with connection 84.

The drum may be controlled as to immersing fluid and pressure as by connections 85 and 86.

Connections 83, 84, 85 and 86 are preferably attached to outside piping by flexible metallic hose or as by flexible pipe in coil form or by other means to permit of movement of the drum. Supports such as 87 and 88 may be provided to give rigidity to the structure. In some instances it is desirable to have vapors being treated about the passageway in which case lines 60, 61 and 62 or line 69 may be open to the interior of drum 76. In other instances it may be considered desirable to have the liquid entering or leaving the passageways to flow through the drum. The pressure within the drum is preferably such as to nearly balance the pressure within the passageways as is obviously required by the flat plate construction and as is desirable to prevent or retard leakage. The drum is preferably controlled as to temperature, heavy heat insulation generally being adequate although the form is adaptable to common means for holding such apparatus at desired temperature. I do not limit my claims to the exact illustrations but recognize that other approximately equivalent means may be used.

I claim:

1. In an apparatus adapted to contact gaseous fluid with liquid fluid, the combination of a multiplicity of parallel passageways contained between approximately parallel plates, baffles projecting inwardly into said passageways from said plates and forming means for dispersing and agglomerating fluid flowed through said passageways, connections from one passageway to another adapted to cause like flow in two or more passageways and continued flow in other passageways, a containing drum adapted to withstand pressure and means for charging and discharging gaseous and liquid fluid from said passageways contained within said drum.

2. In an apparatus adapted to contact gaseous fluid with liquid fluid, the combination of a multiplicity of parallel passageways contained between approximately parallel plates, baffles projecting inwardly into said passageways from said plates and forming means for dispersing and agglomerating fluid flowed through said passageways, connections from one passageway to another adapted to cause like flow in two or more passageways and continued flow in other passageways, a containing drum adapted to withstand pressure and means for charging and discharging gaseous and liquid fluid from said passageways contained within said drum and means for varying the form of dispersion.

3. In an apparatus adapted to contact gaseous fluid with liquid fluid, the combination of a multiplicity of parallel passageways contained between approximately parallel plates, baffles projecting inwardly into said passageways from said plates and forming means for dispersing and agglomerating fluid flowed through said passageways, connections from one passageway to another adapted to cause like flow in two or more passageways and continued flow in other passageways, a containing drum adapted to withstand pressure and means for charging and discharging gaseous and liquid fluid from said passageways contained within said drum and submerging the passageways in a liquid.

4. The process which comprises flowing liquid downwardly at an angle, passing said liquid through selected zones at high rate of speed and through other zones at a lower rate of speed, maintaining approximately equal velocity in successive zones of high speed, diverting all portions of the liquid from a straight flow at points between one or more zones of high speed, passing gaseous fluid in a state of division into contact with said liquid at said selected zones of high rate of speed and commingling said gaseous fluid between said contacts with said liquid and abstracting heat from portions of said gaseous fluid between zones of dispersion and so causing a scrubbing action.

5. In an apparatus of the class described, the combination of an inclined passageway of substantially uniform shape throughout its length, a multiplicity of baffles projecting downwardly within parts of said passageway and adapted to form gaseous masses therein, means for passing liquid upwardly through said passageway, means for passing gaseous fluid through said passageway, said baffles functioning to alternately disperse and to agglomerate the fluid into masses, and means to apply a thermally contacting fluid adjacent to said passageway to control the temperature therewithin.

6. In a process for fractionating a mixture of substances with similar but different boiling points, the steps which comprise alternately dispersing and agglomerating a gaseous fluid while flowing the gaseous fluid through a multiplicity of similar zones, in contact with liquid passing therethrough, imposing a pressure substantially different from atmospheric pressure on the fluid within each of the zones, and imposing an approximately like fluid pressure external to said zones in a manner to prevent undesired transfer or escape of substantial amounts of the mixture between the zone and surrounding fluid.

7. In controlling the transfer of heat between a mixture of similarly boiling substances, vapors of which are flowing with alternating dispersion and agglomeration in contact with liquid at its boiling point contained in a multiplicity of successive like zones, and surrounding fluid material the steps of imposing substantially different from atmospheric pressure on the mixture and imposing a like pressure on the surrounding fluid and holding the surrounding fluid material in indirect heat exchange relation with the mixture.

8. In an apparatus suited to separation of fluids by fractionation, the combination of a flow channel of approximately uniform section throughout its length and containing a plurality of similar unifarious zones, means to alternately disperse and agglomerate gaseous fluid flowed successively through the zones, means to flow liquid through the zones so that the liquid flow and the fluid flow are substantially parallel as they pass the dispersing means, means to apply pressure within the zones, and means to apply a pressure external to and acting on the zones, said pressures being substantially different from atmospheric pressure and nearly alike.

9. The process of fractionation of a mixture of close boiling substances which comprises alternately dispersing and agglomerating gaseous fluid passed successively through similar unifarious zones of a uniform channel containing flowing liquid maintained at about the boiling point thereof and adapted to promote dispersion and agglomeration of gaseous fluid, and flowing the fluid and the liquid parallel at the dispersing point while subjecting the zones to an external pressure substantially different from atmospheric pressure.

10. In a process for promoting mutual escape as between flowing liquid and gaseous phases, the steps which comprise dispersing a gaseous fluid and contacting said fluid with a liquid in a multiplicity of similar zones contained in the line of flow of the liquid, mixing the liquid as it passes from one zone to another, and so enriching the gaseous fluid with respect to a more volatile component as it passes through successive zones in the line of flow while holding said gaseous fluid in one zone in indirect heat exchange relation with liquid contained in a second zone remotely separated from the first zone said two zones both being in the line of flow of the liquid.

11. In an apparatus for fractionation, the combination of a flow channel containing a multiplicity of zones of contact of gaseous and liquid fluids and provided with dispersing edges for dispersing the gaseous fluid and intermediary means for agglomerating the gaseous fluid, said means being arranged to successively intimately contact and separate the two fluids, means for surrounding the flow channel with a fluid under pressure substantially different from atmospheric, and means external to the channel adapted to vary the degree of dispersion of the gaseous fluid.

12. In promoting mutual escape as between vapor and liquid of a mixture of similarly boiling substances, which vapor is flowed into contact with liquid at its boiling point with alternate dispersion and agglomeration of the vapor in a multiplicity of successive like zones, the steps which comprise surrounding the flowing material comprised of vapor and liquid phases of the boiling mixture with a separately contained fluid, imposing a high vacuum on the mixture, imposing a like vacuum on the surrounding fluid and holding said surrounding fluid in indirect heat exchange relation with the boiling mixture, and controlling the flow of the liquid and the vapors so that the dispersion is over the surface of the liquid and in a manner so that no static back-pressure is produced by the steps of dispersion and agglomeration in contact with the liquid and thus maintaining high and substantially like vacuum on all of the zones.

JUSTIN F. WAIT.